(12) United States Patent
He et al.

(10) Patent No.: US 9,027,686 B2
(45) Date of Patent: May 12, 2015

(54) TRUCK FAIRING

(75) Inventors: Wei He, Colfax, NC (US); Mathew Frederick Heinecke, Kernersville, NC (US)

(73) Assignee: Volvo Group North America, LLC, Greensboro, NC (US)

(*) Notice: Subject to any disclaimer, the term of this patent is extended or adjusted under 35 U.S.C. 154(b) by 0 days.

(21) Appl. No.: 14/348,096

(22) PCT Filed: Oct. 12, 2011

(86) PCT No.: PCT/US2011/055939
§ 371 (c)(1),
(2), (4) Date: Mar. 28, 2014

(87) PCT Pub. No.: WO2013/055327
PCT Pub. Date: Apr. 18, 2013

(65) Prior Publication Data
US 2014/0238761 A1    Aug. 28, 2014

(51) Int. Cl.
*B62D 35/02*    (2006.01)

(52) U.S. Cl.
CPC ..................... *B62D 35/02* (2013.01)

(58) Field of Classification Search
CPC ....................................................... B62D 35/02
USPC ........... 280/770; 180/89.12; 296/180.1–180.5
See application file for complete search history.

(56) References Cited

U.S. PATENT DOCUMENTS

| | | | | |
|---|---|---|---|---|
| 4,119,339 A * | 10/1978 | Heimburger | ............... | 296/180.5 |
| 4,262,953 A | 4/1981 | McErlane | | |
| 4,421,354 A | 12/1983 | Lemaster | | |
| 4,467,886 A * | 8/1984 | DeClaire et al. | ............... | 180/197 |
| 4,486,046 A * | 12/1984 | Whitney et al. | ............ | 296/180.4 |
| 4,558,897 A * | 12/1985 | Okuyama et al. | .......... | 296/180.5 |
| 4,640,541 A * | 2/1987 | FitzGerald et al. | ........ | 296/180.1 |
| 5,322,340 A * | 6/1994 | Sato et al. | ................... | 296/180.1 |
| 2005/0161976 A1 | 7/2005 | Ortega et al. | | |
| 2008/0238139 A1 * | 10/2008 | Cardolle | .................... | 296/180.4 |
| 2009/0044991 A1 | 2/2009 | Bullis | | |
| 2009/0085397 A1 | 4/2009 | Cobb | | |
| 2009/0146453 A1 | 6/2009 | Ortega et al. | | |
| 2010/0066123 A1 | 3/2010 | Ortega et al. | | |
| 2010/0143695 A1 * | 6/2010 | Ogawa et al. | ............. | 428/306.6 |
| 2010/0264636 A1 * | 10/2010 | Fausch et al. | ................ | 280/770 |
| 2011/0068605 A1 | 3/2011 | Domo et al. | | |

FOREIGN PATENT DOCUMENTS

CA    1156293 A   * 11/1983
FR    2914267 A1  * 10/2008

OTHER PUBLICATIONS

International Search Report and Written Opinion for corresponding PCT/US2011/055939.

* cited by examiner

*Primary Examiner* — Ruth Ilan
(74) *Attorney, Agent, or Firm* — Martin Farrell; Michael Pruden

(57) ABSTRACT

A truck includes a frame, an operator cab on the frame and a drive axle having a differential. The differential can be connected to a drive shaft. A fairing for directing air flow around the differential is attached to the frame forward of the drive axle and forward of the differential. The fairing can have a non-deflected position and a deflected position.

6 Claims, 10 Drawing Sheets

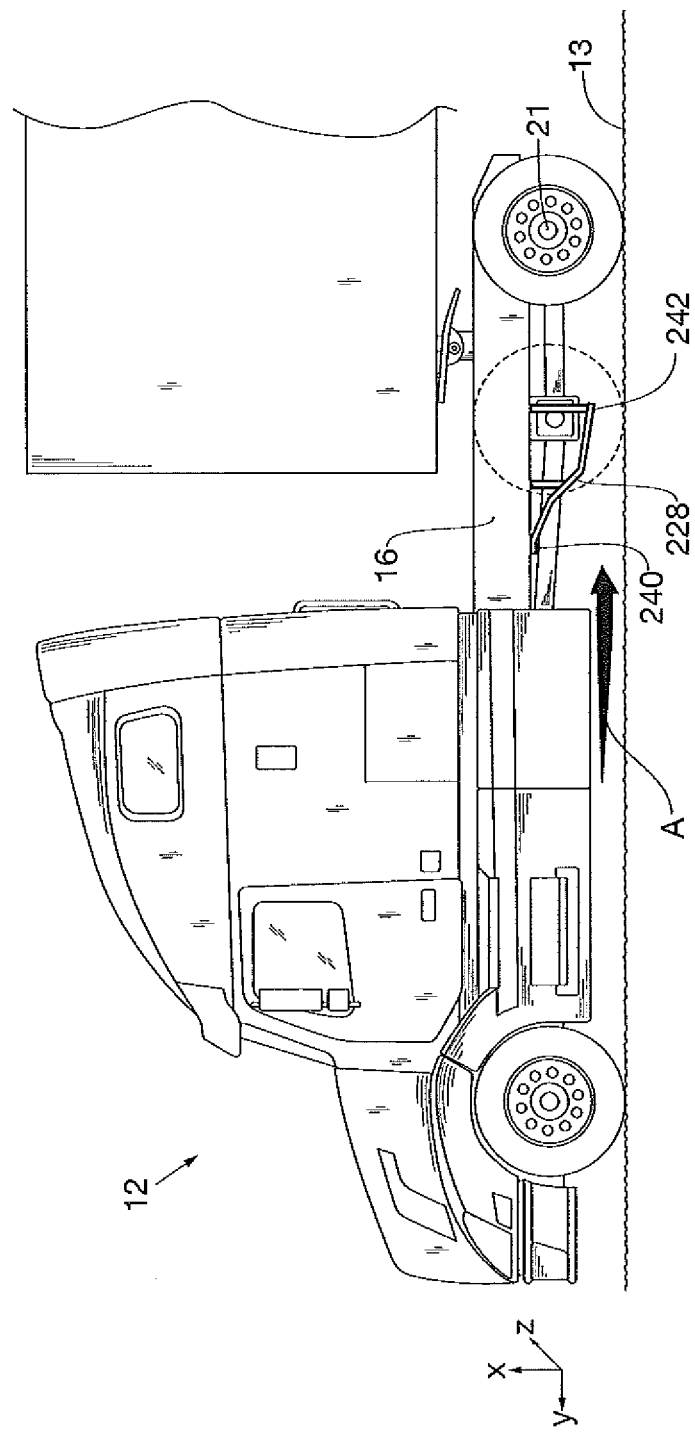

US 9,027,686 B2

TRUCK FAIRING

FIELD OF THE INVENTION

The present invention relates to a fairing for diverting air around a truck differential and related components.

BACKGROUND OF THE INVENTION

Ever increasing fuel costs continue to encourage rigid and semi-trailer tractor designers to search for additional, novel ways to improve vehicle fuel economy. Negative effects caused by airflow during travel are a frequent area of focus, and manufacturers have reduced aerodynamic drag by, for example, altering external shapes to minimize the restraining force that acts directly on any moving body the airstream encounters. Fairings, deflectors, foils, sloping hoods, rolled-under bumpers, recessed door handles can add design costs and weight, and complicate vehicle repair and servicing. Nevertheless, the designers' goal is to offset these negative effects with an overall reduction of the drag coefficient such that vehicle fuel economy can increase.

To continue to improve fuel economy, there remains a need to search for novel ways to minimize negative effects caused by air flow, while continuing to consider and offset negative impacts of such design changes and additional components.

SUMMARY OF THE INVENTION

The following presents a simplified summary of the invention in order to provide a basic understanding of some aspects of the invention. This summary is not an extensive overview of the invention and is not intended to identify key or critical elements of the invention or to delineate the scope of the invention. The purpose of this section is to present some concepts of the invention in a simplified form as a prelude to the more detailed description that is presented later.

A truck can include an operator cab on a frame, and at least one drive axle connected to at least one differential. The at least one differential can be connected to a drive shaft. The axle, differential and drive shaft can be supported by the frame. The truck can include a fairing for directing air flow around the differential. The fairing can be attached to the frame forward of the at the least one drive axle and forward of the at least one differential.

BRIEF DESCRIPTION OF THE DRAWINGS

FIG. 8 is another partial side view of a tractor-trailer and semi-trailer vehicle, showing a fairing according to an embodiment of the invention.

DETAILED DESCRIPTION

Certain exemplary embodiments of the present invention are described below and illustrated in the accompanying figures. The embodiments described are only for purposes of illustrating the present invention and should not be interpreted as limiting the scope of the invention, which, of course, is limited only by the claims below. Other embodiments of the invention, and certain modifications and improvements of the described embodiments, will occur to those skilled in the art and all such alternative embodiments, modifications, and improvements are within the scope of the present invention.

Figure 1:
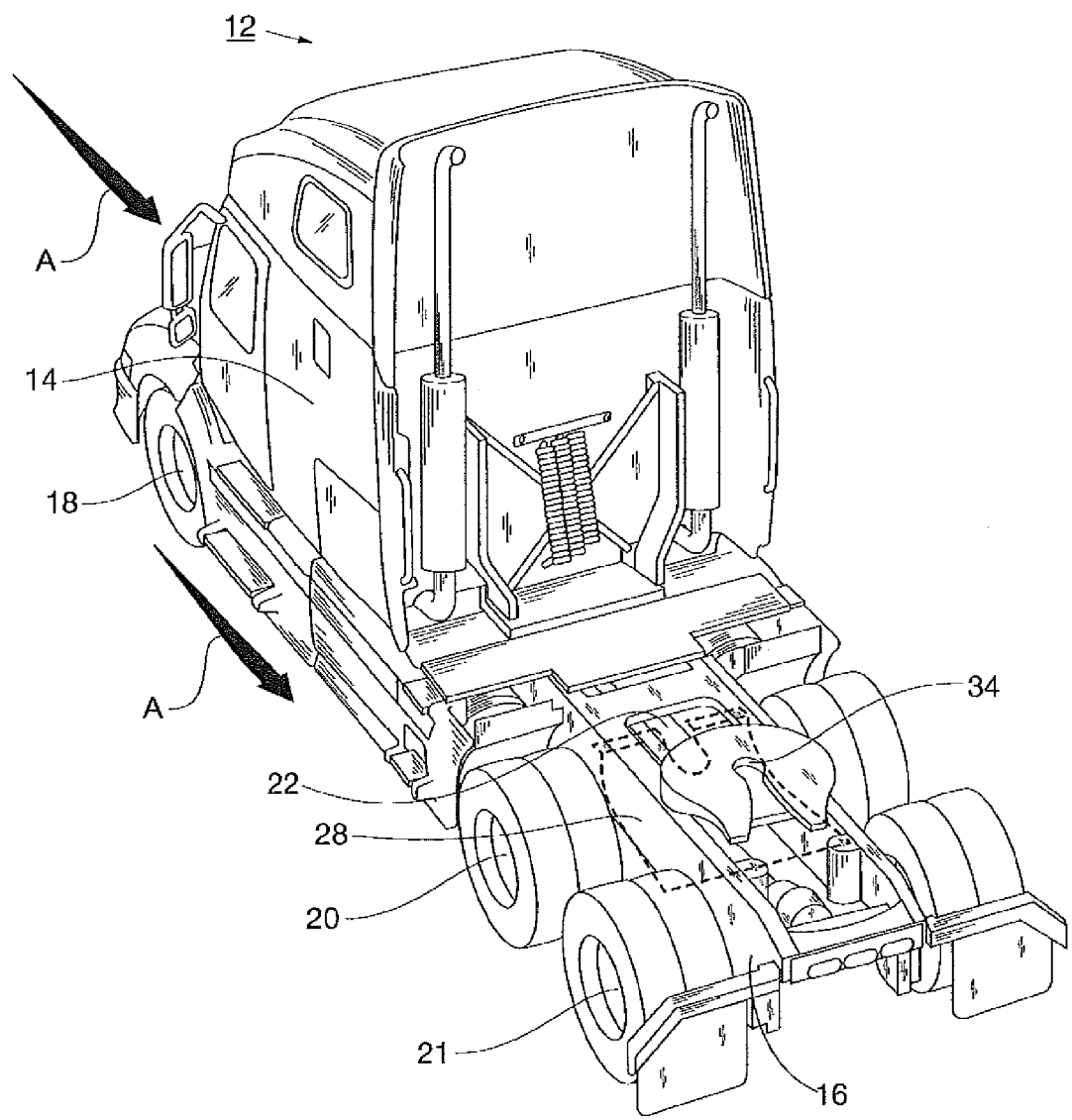
FIG. 1 is a rear perspective view of a tractor-trailer vehicle.
Figure 2:
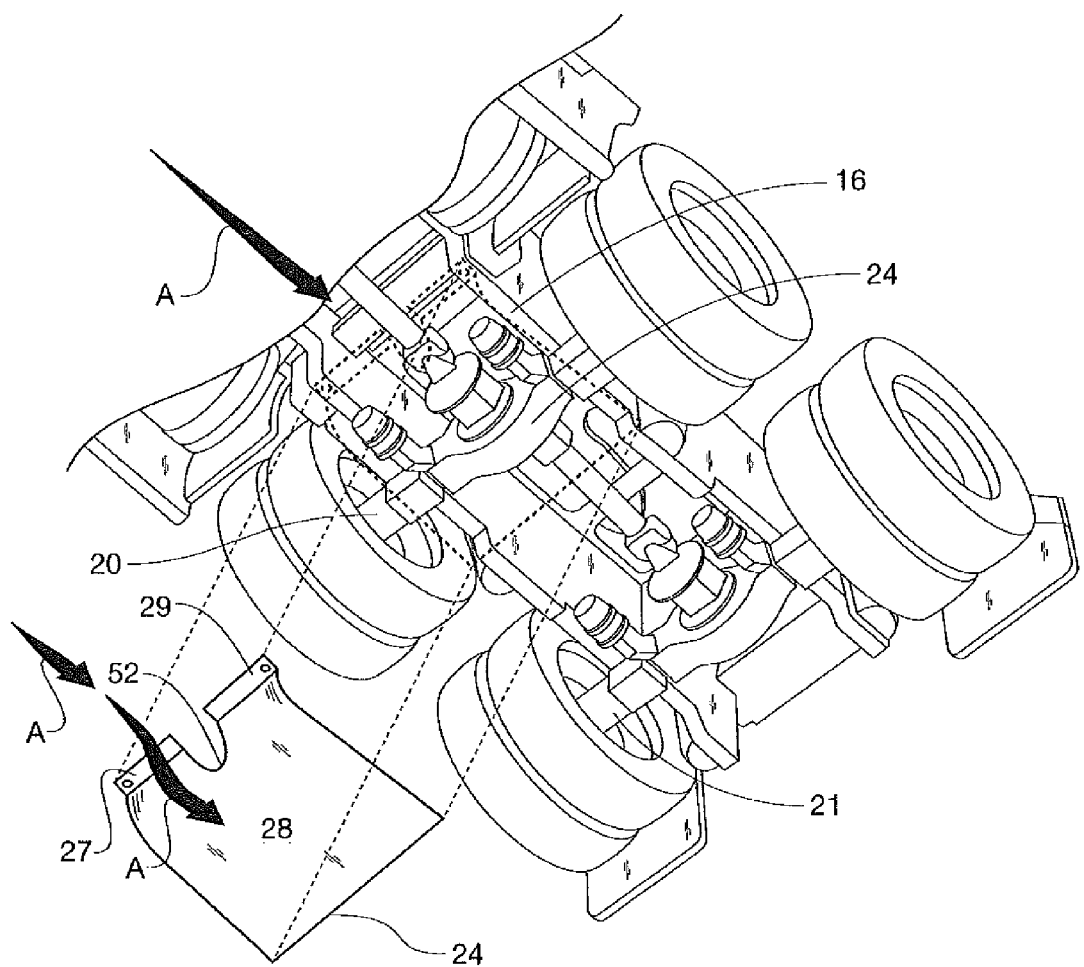
FIG. 2 is a perspective, exploded partial view of a bottom of a tractor-trailer vehicle.

FIG. 1 shows a truck 12 for pulling a semi-trailer. The truck 12 includes an operator cab 14 positioned on a chassis frame 16. The truck 12 has a front steering axle 18 and rear axles 20, 21. At least one of the axles 20, 21 is a drive axle operably connected to a differential 24 (shown in FIG. 2), which is connected to a drive shaft 22. The embodiment of FIG. 2 shows both axles 20, 21 connected as drive axles. The differential 24 translates the rotational movement of the drive shaft 22 into rotational movement of the rear drive axles 20, 21, as is known in the art. A fifth wheel assembly 34 receives and couples with a semi-trailer when attached to the truck 12.

During truck movement, the inventors have determined that the airflow that encounters components under the truck has a detrimental impact upon aerodynamic drag and fuel economy. This underbody air flow can originate from the front of the truck during movement, from air flow entering or drawn into the underside of the truck from the truck sides, or both. Air impinging upon the differential, drive axles and related components can cause undesirable aerodynamic drag. Since some of these components are undergoing exposed rotational movement, as well as vertical and translational movement during truck travel upon various road surfaces and truck maneuvers, the decisions regarding whether and how to shield these components in a cost-effective manner represents challenges for truck designers.

As shown in FIGS. 1 and 2, a fairing 28 can be positioned on the underside of the truck 12 to redirect airflow passing thereunder when the truck is moving in the forward direction of travel. The fairing 28 is shown in FIG. 1 in dashed lines for illustrative purposes. More specifically, the fairing 28 can deflect incoming airflow A to decrease the aerodynamic drag on the truck 12. This shielding helps to minimize the air turbulence caused in part by air striking the drive shaft 22, differential 24, rear drive axle 20 and various other systems, e.g., suspension system, brakes, etc.

The fairing 28 can be attached directly to the chassis frame 16, or to structures attached to the chassis frame 16. In one embodiment, the fairing 28 is positioned forward of and below the differential 24 and rear drive axle 20. The fairing 28 includes a cut-out 52 that can allow the drive shaft 22 to pass therethrough. The cut-out 52 permits optimal positioning of the fairing 28. For example, the cut-out 52 allows the fairing 28 to be positioned close enough to the chassis frame 16, differential 24 and rear drive axle 20 to deflect airflow, while leaving adequate clearance between the fairing 28 and the road. The cut-out 52 provides clearance for the drive shaft 22 so as to avoid damaging the fairing 28 during typical driving conditions, and must be sized to account for vertical and translational movement of the drive shaft 22 during vehicle movement and maneuvers. In one embodiment, a clearance around the drive shaft 22 can be about 1 inch greater than the diameter of the drive shaft plus the typical vertical distance the drive shaft moves during normal truck travel. In yet another embodiment, the fairing 28 can avoid the drive shaft 22 through the use of multiple brackets (not shown) that extend downwardly from the chassis. A fairing can thus be suspended from the brackets, and allow the fairing to avoid the drive shaft 22, but still block air from reaching the differential 24 and rear drive axle 20.

In this embodiment, fairing 28 is rigid and can be a one piece construction. Materials suitable for the fairing 28 include various metals (such as stainless sheetmetal, polymeric materials (such as polypropylene, polycarbonate, or thermoplastic vulcanizates, e.g., Santoprene™ available from ExxonMobil of Houston, Tex.), or composite materials, etc. The fairing is preferably attached to frame rails 16 using conventional fasteners or techniques. In an alternative embodiment, the fairing 28 is attached to the underside of chassis frame 16 at the forward tongues 27, 29. In one embodiment, fairing 28 is removably attached to permit ease of removal for inspection, maintenance or repair. In another embodiment, fairing 28 can have a stowed position and deployed position, whereby inspection, maintenance or repair can occur while the fairing 28 is in the stowed (but not necessarily removed from the truck 12) position.

Figure 3:
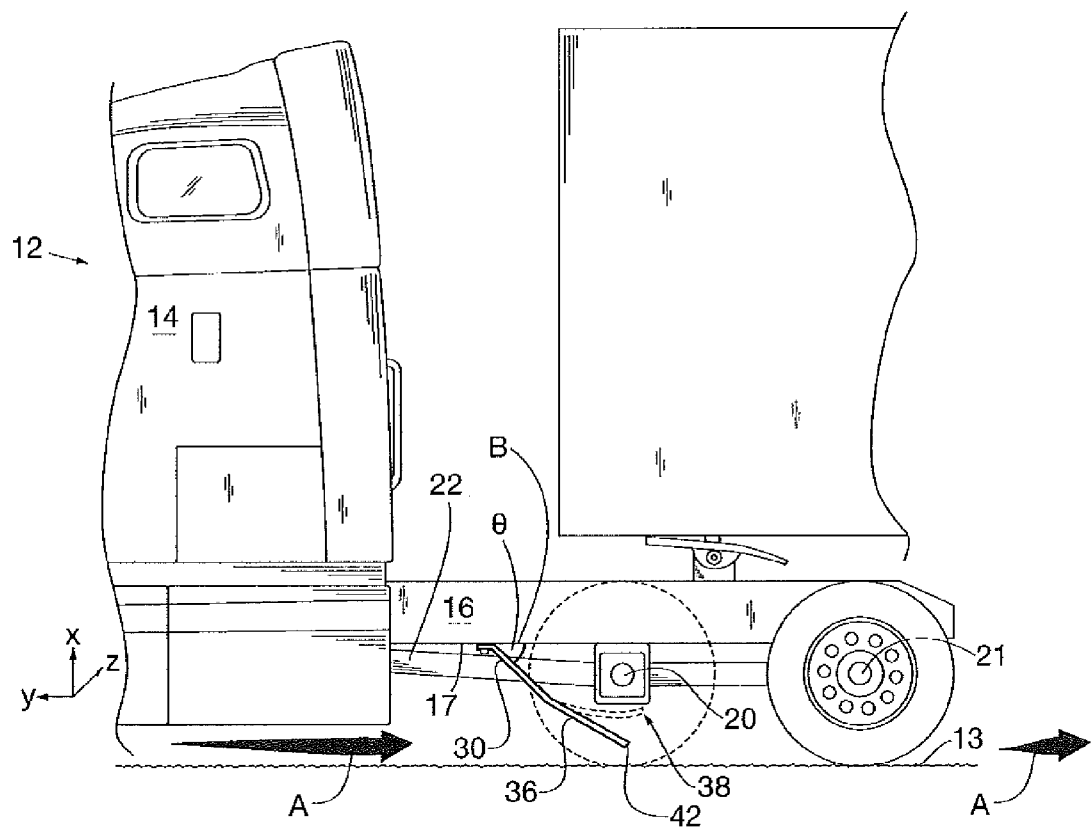
FIG. 3 is a partial side view of a tractor-trailer vehicle with a semi-trailer added.

FIG. 3 shows an embodiment whereby a truck differential fairing 30 is fully or partially compliant in response to impinging air or road obstacles. (The wheels on rear drive axle 20 have been removed in FIG. 3 for ease of illustration.) The truck differential fairing 30 can move between a non-deflected position 36 and a deflected position 38 in response, for example, to incoming airflow A. Specifically, the fairing 30 can move from a non-deflected position 36 to range of deflected positions depending on the speed the truck 12 and the resulting speed of incoming airflow A that impinges the fairing 30. The non-deflected position 36 is the position of the truck differential fairing 30 when the truck is stopped or traveling at a nominal speed. When in the non-deflected position 36, the fairing 30 extends downwardly from the chassis frame 16 toward the road surface 13. The advantages of having a compliant portion of a fairing are several. For example, the amount of drag caused by the fairing itself can be minimized if during movement the fairing adopts the lowest drag profile possible, but still functions to deflect air from the differential and other components when needed during vehicle travel. Allowing the fairing profile to depart from vertical or near vertical minimizes its drag profile. However, during times when the truck is stopped, e.g., during inspection, maintenance, or repair, the fairing is in its non-deflected position, thereby allowing ease of inspection, maintenance, or repair to the underbody components.

The deflected position 38 directs airflow A around the differential 24 and interior portions of the rear drive axle 20 and other components toward the rear of the truck 12. This redirection also serves to permit air flow to avoid substantial contact with the second rear drive axle 21 and related components, when the invention is used with a dual drive axle configuration as shown in the figures.

When the truck 12 is moving in the forward direction, all or a portion of the fairing 30 can flex into the deflected position 38 so that the fairing rearward end 42 extends below the rear drive axle 20. The construction of the fairing 30 can be such that the entire fairing is compliant, or a portion of the fairing 30 is rigid and a portion is compliant. The materials selected for either version can be chosen based upon desired conditions and desired vehicle speeds in which deflection first occurs. For example, the fairing can move into the maximum deflected position 38 when the truck 12 is traveling at a speed of about 55 miles per hour or greater. In one embodiment, the fairing is made of a vulcanized plastic material or rubber material, e.g., Santoprene™.

Figure 4:
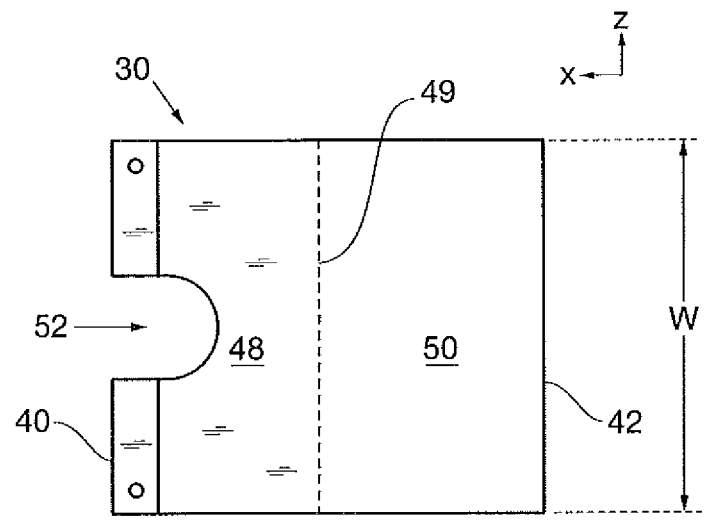
FIG. 4 is a top view of a fairing according to an embodiment of the invention.
Figure 5:
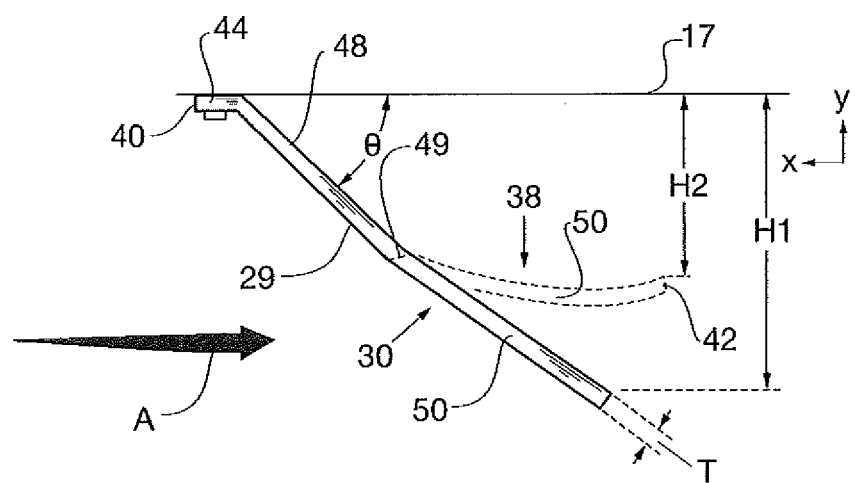
FIG. 5 is a side view of a fairing according to an embodiment of the invention.

FIGS. 4 and 5 show a top and side view, respectively, of the faking 30 comprising a platform 44 adjacent an upper portion 48, and a lower compliant or movable portion 50 extending to the fairing rearward end 42. The described directions, upper and lower, etc., are in relation to the fairing as installed on a truck as shown, for example, in FIG. 3. A transition line 49 delineates the transition between less and more compliant regions of the fairing 30. The upper portion 48 includes a cut-out 52 that can allow the drive shaft 22 (as shown in FIG. 2) to pass therethrough. The cut-out 52 permits optimal positioning of the fairing 30, placing, for example, the upper portion 48 in front of the axle, as discussed above. Fairing 30, when in the non-deflected position, can have a first height $H_1$ that does not exceed the typical distance between the bottom 17 of the chassis frame 16 and the road surface 13. Preferably, the first height $H_1$ is less than the distance between the chassis frame 16 and the road surface 13, and can be between about 15.1 inches (385 mm) and about 15.7 inches (400 mm). When the fairing is forced into the deflected position 38, the fairing rearward end 42 can have a second height $H_2$, which moves the fairing 30 closer to the components it is intended to shield from air flow and reduces the overall drag profile of the fairing. In addition, the fairing 30 can have a z-direction width W that can span the distance substantially between the inner wheels on rear drive axle 20. In one embodiment, the width W can be the distance between the centerlines of the frame rails 16, which is between about 23.6 inches (600 mm) and about 27.6 inches (700 mm). In other embodiments, the fairing 30 comes within about 1.0 inch (25.4 mm) and about 2.0 inches (50.8 mm) of the interior surfaces of the wheels, providing sufficient clearance for the wheels, air pressure monitoring equipment, and brakes to move during vehicle movement and providing sufficient clearance for inspection, maintenance and repair of the wheels and associated equipment without removal of the fairing 30.

As shown in FIG. 5, the fairing 30 can form an angle θ with respect to the line formed by the underside 17 of the chassis frame 16. In the embodiment shown, the angle θ is less than 90°. In other embodiments, the fairing 30 can extend perpendicularly from the chassis frame 16, yet remain movable between the undeflected and deflected positions.

Portions of the fairing 30 can be formed of a flexible material that bends into the deflected position 38 when the airflow A impinges the fairing 30. As described above, the movable portion 50 yields with the incoming airflow A. The fairing 30 can also have a thickness T selected for the purpose of controlling the stiffness of the panel 46, or can have varying thicknesses over its length and width for desired physical and performance characteristics. In an embodiment, the thickness of the panel 46 can be between about 0.07 inch (2 mm) and about 0.15 inches (4 mm).

In other embodiments, the panel 46 can be formed of one or more panels connected together to form the fairing 30. For example, the upper portion 48 can be a first panel and the lower movable portion 50 can be formed of a second panel, the second panel being more flexible than the first panel, as discussed above. In such an embodiment, the first panel can be sheet metal, vacuum corrugated polymeric sheet, or a rigid composite panel, and the second panel can be a flexible sheet or composite.

Figure 6:
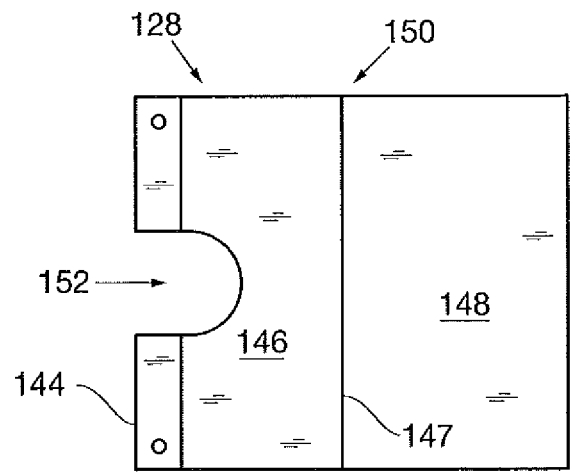
FIG. 6 is another top view of a faking according to an embodiment of the invention.
Figure 7:
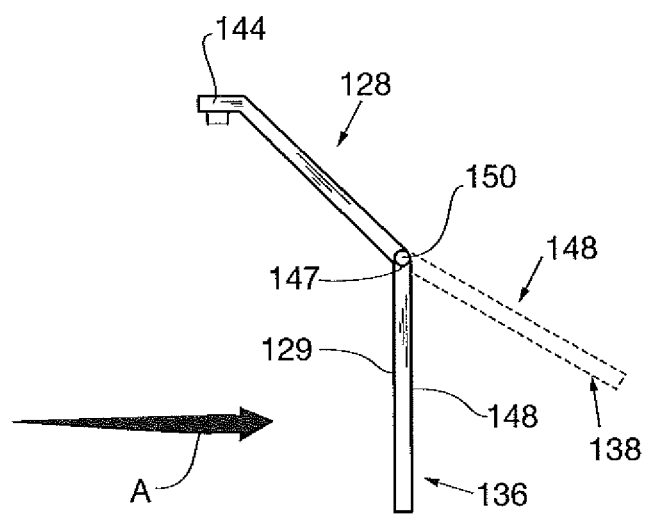
FIG. 7 is another side view of a fairing according to an embodiment of the invention.

FIGS. 6 and 7 show another embodiment of a fairing 128 that can move between undeflected and deflected positions similar to that as described above. The fairing 128 includes a platform 144, upper panel 146 connected to the platform 144, and a lower movable panel 148 connected the upper panel 146 at a pivoting connection 150. A cut-out 152 allows the drive shaft 22 to pass therethrough as described above. The platform 144 functions similarly to the platform 44 described above and shown in FIGS. 3, 4 and 5. The pivoting connection 150 can be a hinge, score line, or other device that allows the lower movable panel 148 to pivot about upper panel end 147. When the truck 12 is not moving, the fairing 128 can be in the non-deflected position 136. When truck 12 accelerates, the airflow A impinges the forward facing surface 129 of the fairing 128, thereby pivoting the lower movable panel 148 into the deflected position 138.

Figure 10:
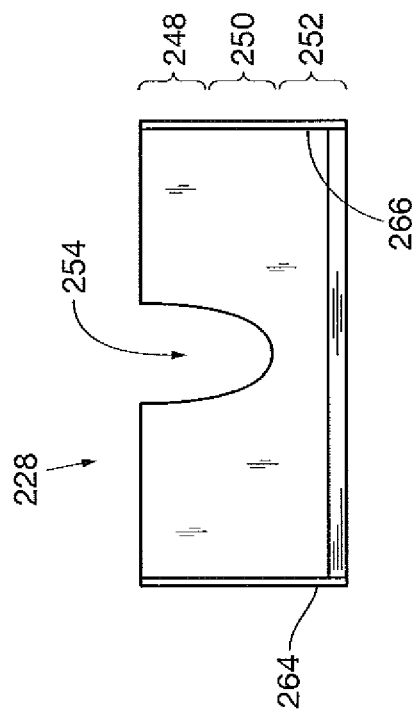
FIG. 10 is a rear view of a fairing according to an embodiment of an invention.
Figure 9:
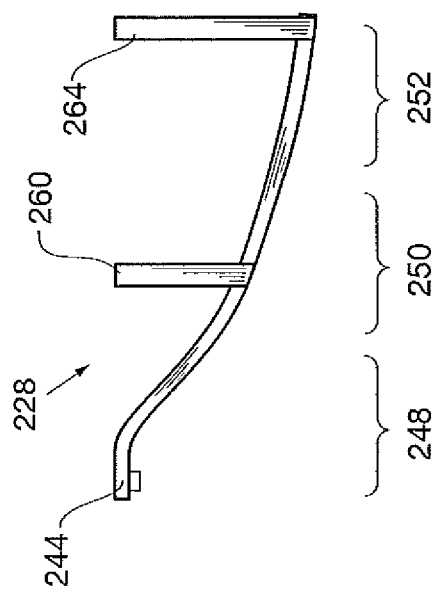
FIG. 9 is another side view of a fairing according to an embodiment of the invention.

FIGS. 8-10 illustrate another embodiment of a fairing 228 used to deflect airflow under the truck 12. As shown in FIG. 8, the fairing 228 can be attached to the chassis frame 16 so that the leading edge 240 of the fairing is positioned forward of the differential 24 and rear drive axle 20. (The wheels on drive axle 20 have been removed in FIG. 8 for ease of illustration.) In addition, the fairing rearward end 242 can extend below the rear drive axle 20. In an alternative embodiment (not shown), the fairing rearward end 242 can extend past the rear axle 20 to the second rear axle 21.

FIGS. 9 and 10 further show the fairing 228 as having a curvilinear shape designed to direct airflow under the truck and minimize drag. The fairing 228 has an upper portion 248, middle portion 250 and lower portion 252. Beginning to the left of FIG. 9 at the fairing platform 244, the upper portion 248 slopes downwardly and rearward toward the truck rear to form the middle portion 250. The fairing 228 then straightens at the lower portion 252 to have a generally or near parallel arrangement with the chassis frame 16 and the road surface 13. The fairing 228 can be an integral structure. In an alternative embodiment, (shown in FIG. 12) the fairing rearward end 242 can extend past the rear axle 20 to the second rear axle 21.

FIG. 10 depicts a rear view of fairing 228, showing the upper portion 248 and middle portion 250, including a cut-out 254 that allows the drive shaft 22 (not shown) to pass therethrough. As described above, the cut-out 254 can permit the fairing 228 to be positioned close enough to the differential 24 and rear drive axle 20 so that the drive shaft 22, differential 24 and rear drive axle 20 do not damage the fairing 228 during typical driving conditions.

Figure 12:
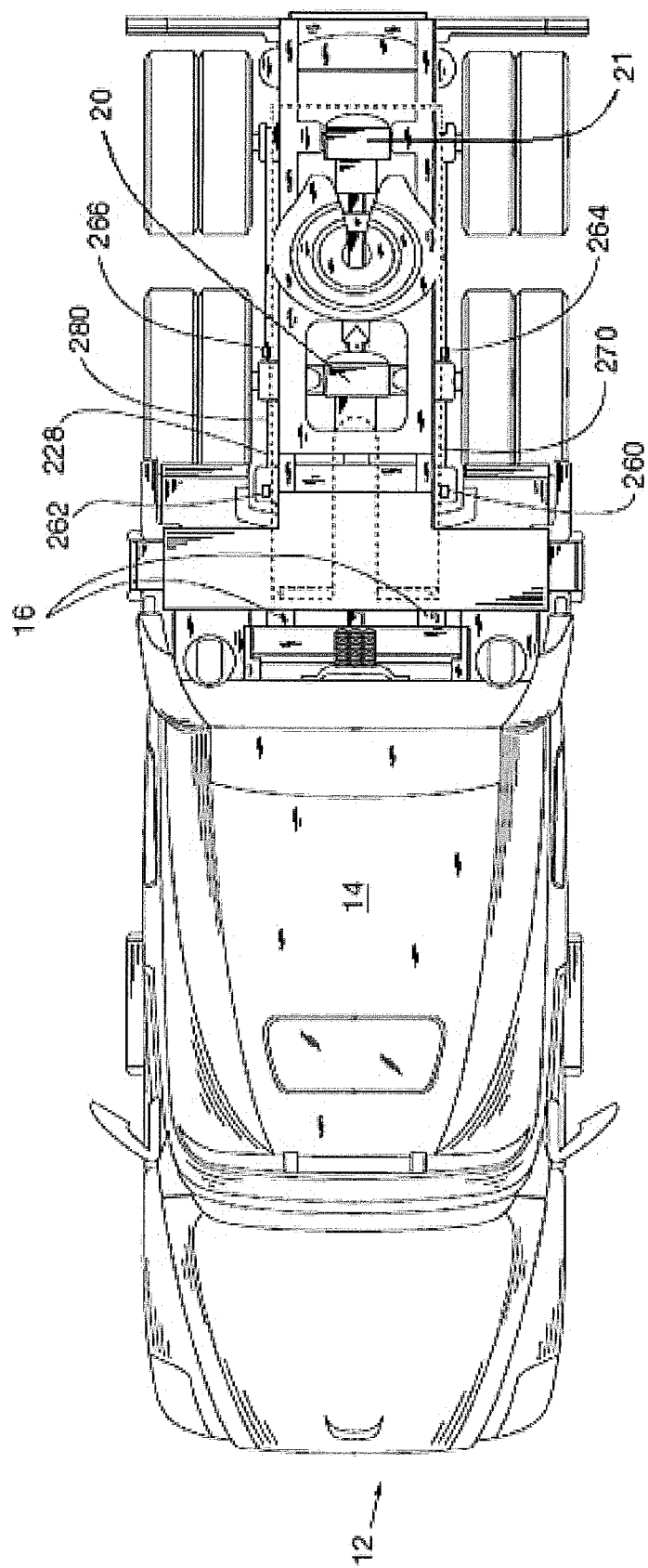
FIG. 12 is another top view of a tractor-trailer vehicle.

Various attachments can be used to secure the fairings shown in FIGS. 8-10 to the chassis frame 16 yet allow for easy removal during truck maintenance or repairs. The platform 244 can be used to attach the upper portion 248 to the chassis frame 16 similarly to the embodiments described above. As shown in FIGS. 9, 10, and 12 a platform 244 and a plurality of elongated brackets 260, 262, 264, and 266 can attach the fairing 228 to the chassis frame 16 (not shown). Elongated bracket pairs 260, 262 attach the middle portion 250 to the chassis frame 16. Elongated bracket pairs 264, 266 attach the middle portion 250 of the fairing 228 to the chassis frame 16. For example, one end of the bracket (in each pair) can be attached to the fairing 228 using a removable fastener while the opposite end of the bracket can be secured to the chassis frame 16 using a removable fastener. Typical removable fasteners can be used on the platform 244 and brackets 260, 262, 264 and 266 to retain the fairing 228 in position during normal vehicle operation yet allow for quick removal of the fairing if needed. In other embodiments, only one bracket pair may be needed.

Figure 11:
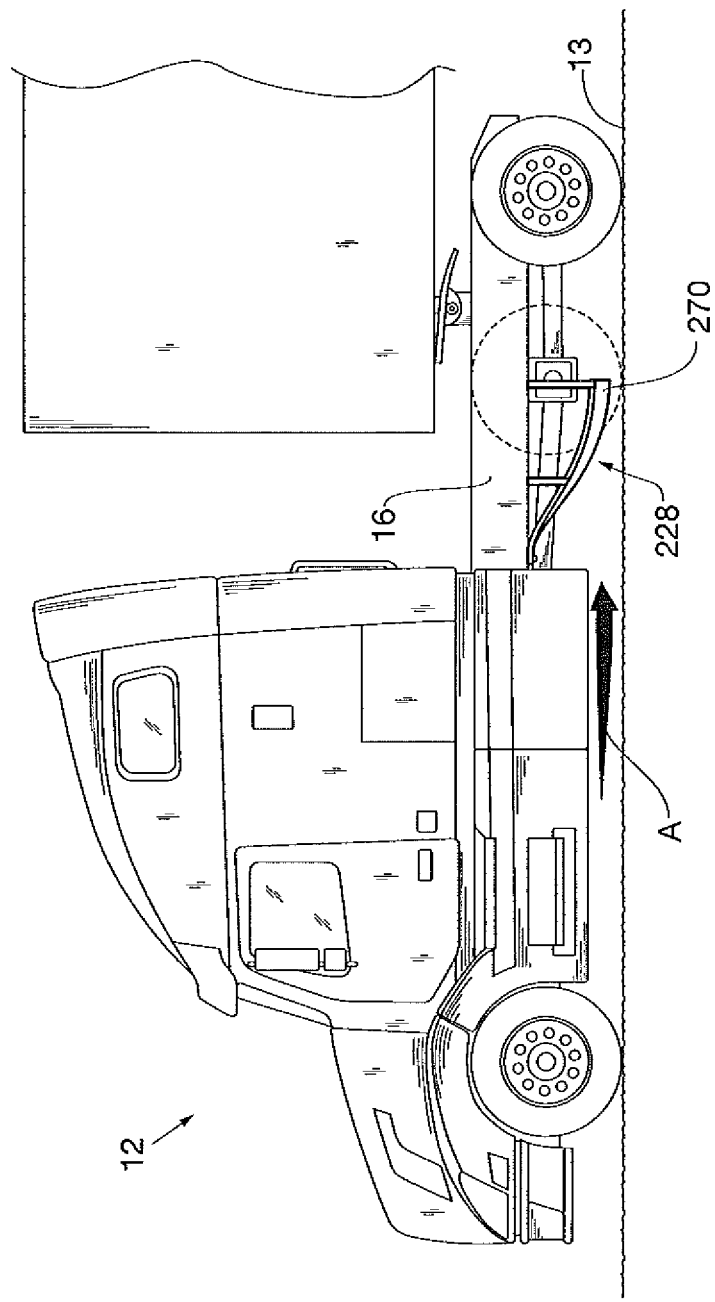
FIG. 11 is another partial side view of a tractor-trailer and semi-trailer vehicle, showing a fairing thereon according to an embodiment of the invention.
Figure 13:
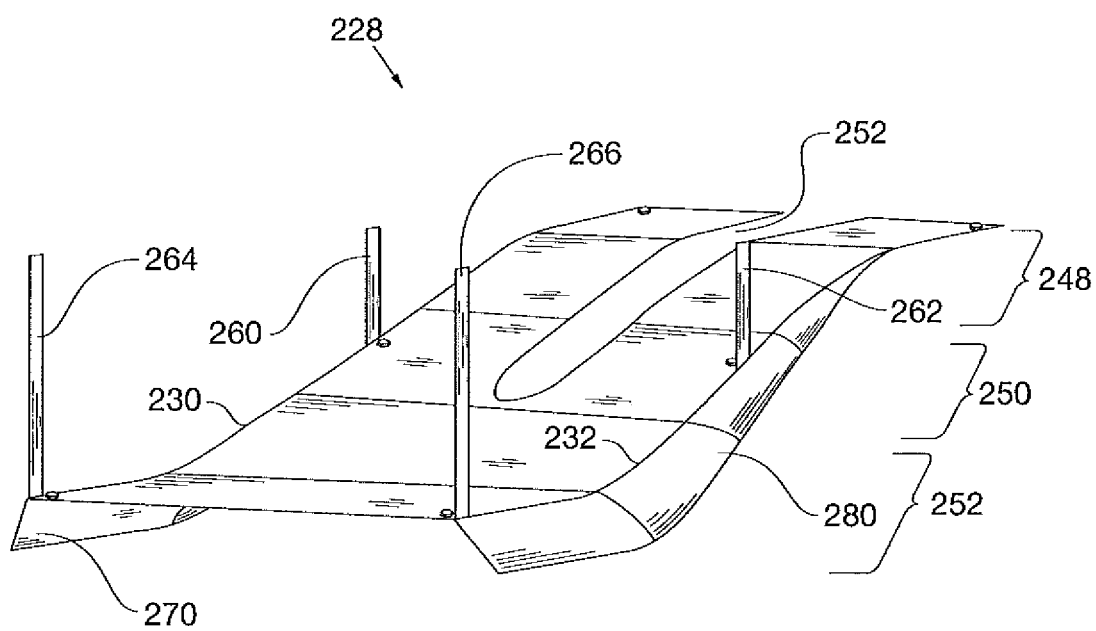
FIG. 13 is a perspective view of a fairing according to an embodiment of the invention.

FIGS. 11-13 depict fairing 228 that performs analogous functions as the preceding fairings. (The wheels on rear drive axle 20 have been removed in FIG. 11 for ease of illustration.) The fairing 228 has an upper portion 248, middle portion 250, and lower portion 252, and a cut-out 254 that allows the drive shaft 22 to pass therethrough. However, the fairing 228 shown in FIGS. 11 and 12 include optional side panels 270, 280 that can block some crosswinds passing beneath truck 12 and across the path of travel. The side panels 270, 280 can also help stabilize vehicle travel from crosswind buffeting and reduce air turbulence under the truck 12. FIG. 12 illustrates the fairing 228 as extending beneath both the front-most drive axle 20 and differential and the rearmost drive axle 21 and differential.

As shown in FIG. 13, the side panels 270, 280 extend downwardly from opposing sides 230, 232 of the fairing 228. The side panels 270, 280 can also extend along the length of the opposing sides 230, 232. While FIG. 13 illustrates single side panels 270, 280 extending from either side of the fairing 228, in alternative embodiments, the side panels 270, 280 can be formed of a plurality of panels connected to the sides 230, 232 of the fairing.

The above descriptions of preferred embodiments of the invention are intended to illustrate various aspects and features of the invention without limitation. Persons of ordinary skill in the art will recognize that certain changes and modifications can be made to the described embodiments without departing from the scope of the invention. All such changes and modifications are intended to be within the scope of the appended claims. Features from one embodiment or aspect may be combined with features from any other embodiment or aspect in any appropriate combination. For example, any individual or collective features of method aspects or embodiments may be applied to apparatus, product or component aspects or embodiments and vice versa.

We claim:

1. A truck comprising:
a frame with an operator cab thereon;
a drive axle having a differential, the differential connected to a drive shaft; the axle, the differential and the drive shaft being supported on the frame; and
a fairing for directing air flow around the differential, the fairing attached to the frame forward of the drive axle and forward of the differential and extending beneath the drive axle and differential, the fairing having a cut-out to permit at least a portion of the drive shaft to pass therethrough wherein the fairing is capable of being in a non-deflected position when the truck is stopped, and being in a deflected position when the truck is moving and encounters air flow or an object, either of which causes the fairing to attain its deflected position.

2. The truck of claim 1, wherein the fairing further comprises a first panel attached to the frame, and a second panel pivotably connected to the first panel and movable between the non-deflected position and the deflected position responsive to airflow encountered by the fairing.

3. The truck of claim 2, wherein the second panel has a lower end that is positioned under the axle when the second panel is in the deflected position.

4. A fairing for directing air flow underneath a truck, the truck having a frame, a drive axle having a differential, the differential connected to a drive shaft, the axle, the differential and the drive shaft being supported on the frame, the fairing comprising:

a first portion that is attached to the frame; and a second portion that has at least one panel movable between a first position when the truck is stopped, and a second position when the air flow underneath the truck impinges the fairing when the truck is moving, the at least one panel in the second position deflecting the flow of air around the drive axle and the differential.

5. The fairing of claim 4, further comprising a means for permitting the fairing to move between the first position and the second position.

6. The fairing of claim 4, wherein the fairing comprises a cut-out for permitting at least a portion of the drive shaft to pass therethrough.

* * * * *